United States Patent
Liu et al.

(10) Patent No.: US 9,903,381 B2
(45) Date of Patent: Feb. 27, 2018

(54) SYSTEM AND METHOD FOR CONTROLLING FORWARD/REVERSE ROTATION OF FAN

(71) Applicant: DELTA ELECTRONICS, INC., Taoyuan (TW)

(72) Inventors: Cheng-Chieh Liu, Toayuan (TW);
Chin-Ping Su, Taoyuan (TW);
Te-Sheng Su, Taoyuan (TW);
Wen-Chih Wang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 276 days.

(21) Appl. No.: 14/991,709

(22) Filed: Jan. 8, 2016

(65) Prior Publication Data

US 2016/0238014 A1    Aug. 18, 2016

Related U.S. Application Data

(60) Provisional application No. 62/115,812, filed on Feb. 13, 2015.

(30) Foreign Application Priority Data

Nov. 18, 2015  (CN) .......................... 2015 1 0796836

(51) Int. Cl.
*H02P 6/30* (2016.01)
*F04D 27/00* (2006.01)
*F04D 19/00* (2006.01)
*F04D 25/08* (2006.01)

(52) U.S. Cl.
CPC ......... *F04D 27/004* (2013.01); *F04D 19/005* (2013.01); *F04D 25/08* (2013.01); *H02P 6/30* (2016.02)

(58) Field of Classification Search
USPC ................................. 318/255, 256, 257, 268
See application file for complete search history.

(56) References Cited

U.S. PATENT DOCUMENTS 4,555,654 A * 11/1985 Spradling ............... H02P 23/24
                                                                                318/751
7,459,870 B2 * 12/2008 Beck ........................ F01P 11/12
                                                                                318/260

* cited by examiner

*Primary Examiner* — Bentsu Ro
(74) *Attorney, Agent, or Firm* — Kirton McConkie; Evan R. Witt

(57) ABSTRACT

A control system includes a motor, an interface circuit, a motor controller and a detection control circuit. The interface circuit receives and converts a pulse width modulation signal. The fan dissipates heat when the motor is operated in a forward rotation mode and eliminates dust when the motor is operated in a reverse rotation mode. The detection control circuit reads a duty cycle of the converted pulse width modulation signal in real time. When the motor is operated in the forward rotation mode, the detection control circuit drives the motor controller to control the rotation speed of the fan according to the duty cycle. If the duty cycle is lower than or equal to a first threshold value, the detection control circuit drives the motor controller to switch operation mode of the motor from the forward rotation mode to the reverse rotation mode.

20 Claims, 6 Drawing Sheets

SYSTEM AND METHOD FOR CONTROLLING FORWARD/REVERSE ROTATION OF FAN

CROSS-REFERENCE TO RELATED APPLICATION

This application claims the benefit of U.S. Provisional Application No. 62/115,812 filed on Feb. 13, 2015, and entitled "BRUSHLESS FAN CONTROL METHOD AND SYSTEM CAPABLE OF PERFORMING FORWARD AND REVERSE ROTATION TO REMOVE DUST", the entirety of which is hereby incorporated by reference.

FIELD OF THE INVENTION

The present invention relates to a control system and a control method, and more particularly to a control system and a control method for controlling a forward/reverse rotation of a fan.

BACKGROUND OF THE INVENTION

Generally, a fan is a very important heat-dissipating mechanism for an electronic device. Since the operating performance, stability and service life of the electronic components of the electronic device are directly influenced by temperature, hence the structure of the fan is designed according to the type and the structure of the electronic device.

The installation of the fan in the electronic device is designed for dissipating heat. For preventing from adversely affecting the electronic device, cooling air is inhaled into the casing of the electronic device through an inlet and heated air is exhausted to the surroundings through an outlet. However, experienced from the operation of the fan, a problem that dust is readily accumulated on the fan blade. If a great deal of dust is accumulated on the fan blade, the output airflow is reduced, and the heat-dissipating efficacy of the fan is impaired. Under this circumstance, the electronic device with the fan is possibly damaged. In addition, the dust accumulated on the fan blade may increase the loading of the fan motor, increase the consumed electric power and shorten the service life of the fan.

For solving the problem of accumulating dust, a fan with a dust-eliminating function had been disclosed. While the electronic device is turned on, the control system for controlling the fan starts to reversely rotate the fan to remove the accumulated dust on the fan blade. Then, the fan is forwardly rotated to dissipate heat. However, since the fan is operated for a long term, the problem of accumulating dust on the fan blade still occurs. In other words, the control system cannot effectively eliminate dust.

As mentioned above, the control system has to dynamically control the forward/reverse rotation of the fan in order to effectively eliminate dust. Moreover, if the accumulated dust on the fan blade is serious, the control system has to control the reverse rotation of the fan to eliminate dust in time. However, this designing concept faces some problems. For example, because of an external force or some other factors, the erroneous judgment of the control system will erroneously switch the forward rotation of the fan to the reverse rotation or erroneously switch the reverse rotation of the fan to the forward rotation. Under this circumstance, the fan cannot effectively dissipate heat of the electronic device or eliminate dust.

Moreover, the electronic device is equipped with a protection mechanism. The protection mechanism is enabled or disabled according to the result of judging whether the fan is normally operated. In case that the fan is normally operated (e.g., forward rotation or reverse rotation), a main circuit of the electronic device judges that the fan is normal and the protection mechanism is disabled. Whereas, in case that the fan is abnormally operated and/or stopped, the main circuit judges that the fan is abnormal and the protection mechanism is enabled. The protection mechanism can prevent damage of the electronic device because of the overheating problem. In other words, even if the control system can dynamically control the forward/reverse rotation of the fan, the erroneous judgment still possibly occurs. In the transition interval when operation of the motor is switched between the forward rotation and the reverse rotation, the fan is gradually stopped because of inertia (i.e., in an inertia stop state time period). In the inertia stop state, the main circuit erroneously judges that the fan is abnormal, and thus the protection mechanism is enabled. Under this circumstance, the performance of the electronic device is impaired. Therefore, how to design a control system capable of dynamically controlling operation of the fan to be switched from forward rotation to reverse rotation in real time and avoiding enabling a protection mechanism erroneously without modifying a greater portion of the inner circuitry of the control system and employing additional circuitry and control method are major research and development topics.

Therefore, there is a need of providing a control system and a control method for controlling a forward/reverse rotation of a fan so as to overcome the above drawbacks.

SUMMARY OF THE INVENTION

An object of the present invention provides a control system and a control method for controlling a forward/reverse rotation of a fan. The motor is operated in the forward rotation mode or the reverse rotation mode according to a result of double-checking a duty cycle of a pulse width modulation signal. The control system can dynamically control the forward rotation of the motor to dissipate heat of the electronic device and dynamically control the reverse rotation of the motor to remove dust from the fan blade. Moreover, the control system and the control method can minimize the possibility of erroneously controlling the switching action between the forward rotation and the reverse rotation.

Another object of the present invention provides a control system and a control method for controlling a forward/reverse rotation of a fan. The control system can control the rotation direction of the motor according to the automatic detecting mechanism and the internal counting mechanism. Consequently, the heat-dissipating demand of the electronic device can be monitored in real time. Moreover, in case that the heat-dissipating demand is lower, the mechanism of automatically eliminating dust can be enabled to enhance the dust-eliminating efficacy.

A further object of the present invention provides a control system and a control method for controlling a forward/reverse rotation of a fan. Moreover, the control system is simplified and need not be additionally equipped with complicated circuitry. For example, the relatively simpler circuitry configurations of a frequency output circuit and a frequency simulation circuit. While the motor is in an inertia stop state, the frequency simulation circuit issues the simulated frequency signal to a main circuit of the electronic device. Consequently, while the motor is in the inertia stop state, the main circuit judges that the fan is normally operated and the protection mechanism is not enabled In accordance with an aspect of the present invention, there is provided a control system for controlling a forward/reverse rotation of a fan of an electronic device. The control system includes a motor, an interface circuit, a motor controller, and a detection control circuit. The motor is used for driving rotation of the fan. The interface circuit is used for receiving and converting a pulse width modulation signal. The motor controller is electrically connected with the motor for controlling a rotation speed of the motor and controlling the motor to be operated in a forward rotation mode or a reverse rotation mode. The fan is forwardly rotated to dissipate heat when the motor is operated in the forward rotation mode. The fan is reversely rotated to eliminate dust when the motor is operated in the reverse rotation mode. The detection control circuit is electrically connected with the interface circuit and the motor controller for reading a duty cycle of the converted pulse width modulation signal in real time. When the motor is operated in the forward rotation mode, the detection control circuit drives the motor controller to control the rotation speed of the fan according to the duty cycle, and the detection control circuit double-checks whether the duty cycle is lower than or equal to a first threshold value. If the duty cycle is lower than or equal to the first threshold value, the detection control circuit drives the motor controller to switch operation mode of the motor from the forward rotation mode to the reverse rotation mode.

In accordance with another aspect of the present invention, there is provided a control method for a control system. The control system controls a fan of an electronic device according to a pulse width modulation signal outputted from the electronic device. The control system includes a motor for rotating the fan. The control method includes the following steps. In a step (a), the control system is started. In a step (b), the motor is controlled to be operated in a forward rotation mode. Then, a step (c) is performed to double-check whether a duty cycle of the pulse width modulation signal is lower than or equal to a first threshold value. In a step (d), if the duty cycle of the pulse width modulation signal is lower than or equal to the first threshold value in the step (c), operation mode of the motor is switched from the forward rotation mode to a reverse rotation mode. Then, a step (e) is performed to double-check whether the duty cycle of the pulse width modulation signal is higher than or equal to a second threshold value. In a step (f), if the duty cycle of the pulse width modulation signal is not higher than or equal to the second threshold value in the step (e), a judging step is performed to judge whether the motor has been operated in the reverse rotation mode for a predetermined reverse time period. In a step (g), if the motor has been operated in the reverse rotation mode for the predetermined reverse time period in the step (f), the step (b) is performed again.

In accordance with a further aspect of the present invention, there is provided a control system for controlling forward/reverse rotation of a fan of an electronic device. The control system includes a motor, an interface circuit, a motor controller, a detection control circuit, a frequency simulation circuit, and a frequency output circuit. The motor is used for driving rotation of the fan of the electronic device. The interface circuit is used for receiving and converting a pulse width modulation signal. The motor controller is electrically connected with the motor for controlling a rotation speed of the motor and controlling the motor to be operated in a forward rotation mode or a reverse rotation mode. The fan is forwardly rotated to dissipate heat when the motor is operated in the forward rotation mode. The fan is reversely rotated to eliminate dust when the motor is operated in the reverse rotation mode. The detection control circuit is electrically connected with the interface circuit and the motor controller for reading a duty cycle of the converted pulse width modulation signal in real time. When the motor is operated in the forward rotation mode, the detection control circuit drives the motor controller to control the rotation speed of the fan according to the duty cycle, and the detection control circuit double-checks whether the duty cycle is lower than or equal to a first threshold value. If the duty cycle is lower than or equal to the first threshold value, the detection control circuit drives the motor controller to switch operation mode of the motor from the forward rotation mode to the reverse rotation mode. The frequency simulation circuit is electrically connected with the detection control circuit. While the motor is in an inertia stop state, the frequency simulation circuit issues a simulated frequency signal to the electronic device. The frequency output circuit is electrically connected with the motor controller and the detection control circuit. While the motor is operated in the forward rotation mode or the reverse rotation mode, an actual frequency signal corresponding to the rotation speed of the motor is outputted from the frequency output circuit to the electronic device through the detection control circuit and the frequency simulation circuit.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
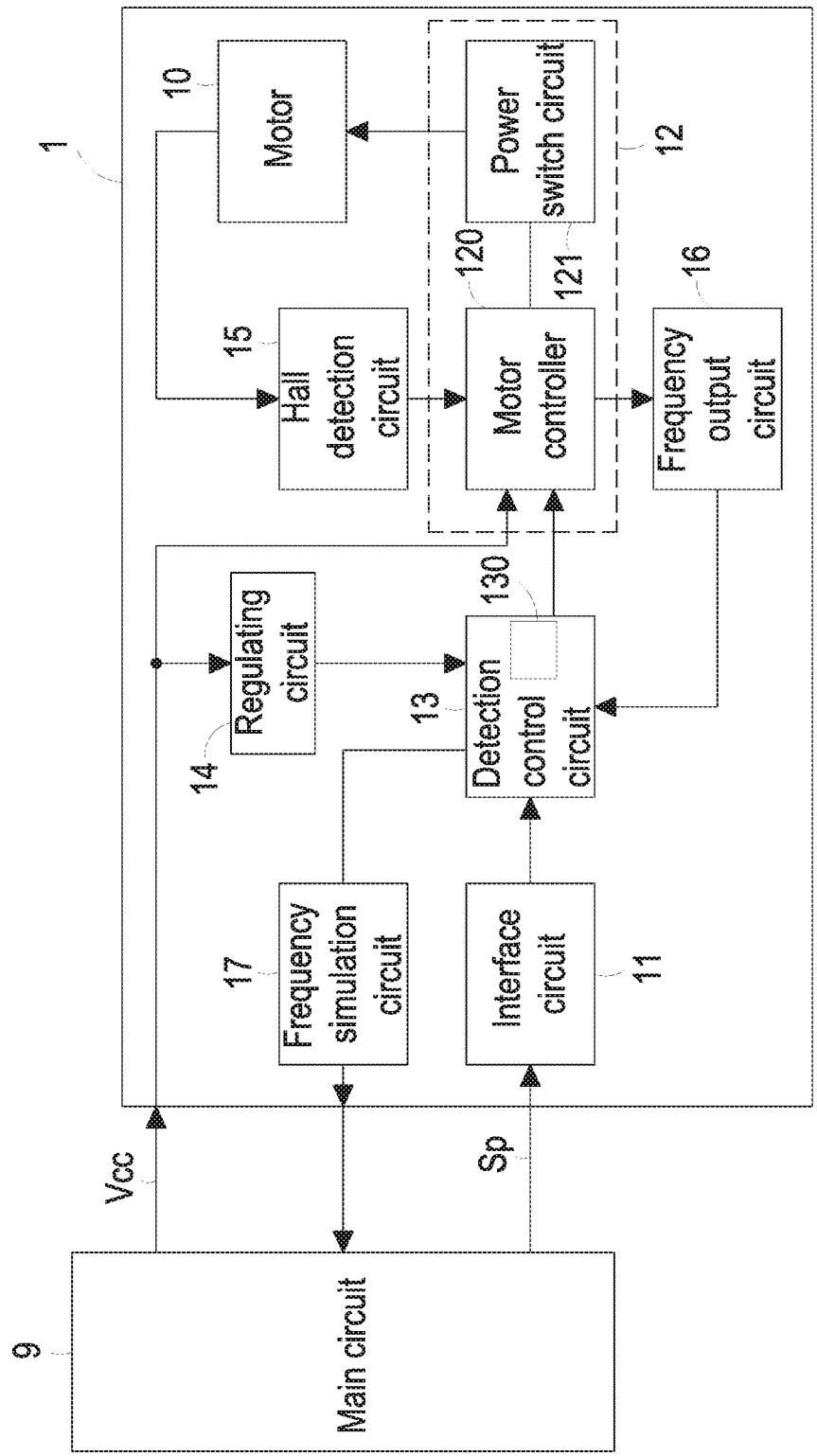
FIG. 1 is a schematic circuit block diagram illustrating a control system for controlling forward/reverse rotation of a fan according to an embodiment of the present invention.

FIG. 1 is a schematic circuit block diagram illustrating a control system for controlling forward/reverse rotation of a fan according to an embodiment of the present invention. The control system 1 is used for controlling a fan (not shown) of an electronic device. In particular, the control system 1 is used for controlling a forward rotation of the fan to dissipate heat or a reverse rotation of the fan to eliminate dust. The electronic device has a main circuit 9. The main circuit 9 is electrically connected with the control system 1. The main circuit 9 can control the operations of the electronic device. According to the heat-dissipating demand of the electronic device, the main circuit 9 generates a dynamically-adjustable pulse width modulation signal Sp to the control system 1. According to the pulse width modulation signal Sp, the control system 1 controls a rotation speed and a rotation direction of the fan. A duty cycle of the pulse width modulation signal Sp is determined according to the heat-dissipating demand of the electronic device. If the heat-dissipating demand of the electronic device is increased, the duty cycle of the pulse width modulation signal Sp is correspondingly increased. Whereas, if the heat-dissipating demand of the electronic device is decreased, the duty cycle of the pulse width modulation signal Sp is correspondingly decreased.

As shown in FIG. 1, the control system 1 comprises a motor 10, an interface circuit 11, a motor control module 12 and a detection control circuit 13. An example of the motor 10 includes, but is not limited to, a three-phase brushless DC motor. Upon rotation of the motor 10, the fan is synchronously rotated. Another example of the motor 10 is a single-phase motor.

The motor control module 12 is electrically connected with the motor 10 for controlling the motor 10 (and so as the fan) to be operated in a forward rotation mode or a reverse rotation mode. In the forward rotation mode, the fan is forwardly rotated to dissipate heat. In the reverse rotation mode, the fan is reversely rotated to eliminate dust. The motor control module 12 comprises a motor controller 120 and a power switch circuit 121. The power switch circuit 121 is electrically connected with the motor 10, and comprises at least one power switch element (not shown). The power switch circuit 121 receives electric energy from an external power source (e.g., a utility power source). By alternately turning on and turning off the at least one power switch element of the power switch circuit 121, the electric energy is converted into an output current to drive the motor 10. Moreover, the operation of the power switch circuit 121 can adjust the magnitude of the current of the motor 10 in order to adjust the rotation speed of the motor 10 and the rotation speed of the fan, or the operation of the power switch circuit 121 can adjust the direction of the current of the motor 10 in order to adjust the rotation direction of the motor 10 and the rotation direction of the fan. The motor controller 120 is electrically connected with the power switch circuit 121 in order to control the operation of the power switch circuit 121. For example, the motor controller 120 controls the switching sequence of the power switch element of the power switch circuit 121. Consequently, the magnitude and direction of the current received by the motor 10 are adjusted, and the rotation speed and the rotation direction of the fan are correspondingly adjusted. In an embodiment, the rotation speed of the motor 10 is fixed at 3000 RPM when the motor 10 is in the reverse rotation mode.

The interface circuit 11 is electrically connected with the main circuit 9 of the electronic device. The interface circuit 11 is used for receiving the pulse width modulation signal Sp from the main circuit 9 and converting the received pulse width modulation signal Sp.

The detection control circuit 13 is electrically connected with the interface circuit 11 and the motor controller 120 of the motor control module 12. The converted pulse width modulation signal Sp from the interface circuit 11 is read by the detection control circuit 13 in real time, so that the duty cycle of the pulse width modulation signal Sp is acquired. Consequently, a driving signal reflecting the duty cycle is outputted from the detection control circuit 13 to the motor controller 120 (as arrow shown). According to the duty cycle of the driving signal, the motor controller 120 controls the switching sequence of the power switch element of the power switch circuit 121. Consequently, the magnitude and direction of the current received by the motor 10 are adjusted. The motor controller 120 can control the rotation speed of the motor 10 and the operation mode of the motor 10 (i.e., the forward rotation mode or the reverse rotation mode).

When the motor 10 is operated in the forward rotation mode, the detection control circuit 13 drives the motor controller 120 to control the rotation speed of the fan (so as of the fan) according to the result of reading the duty cycle, and the detection control circuit 13 double-checks whether the duty cycle is lower than or equal to a first threshold value. If the duty cycle is lower than or equal to the first threshold value, the detection control circuit 13 drives the motor control module 12 to switch the operation mode of the motor 10 from the forward rotation mode to the reverse rotation mode according to the driving signal. In an embodiment, the detection control circuit 13 is a microprocessor, and the motor control module 12 is a motor driver integrated circuit. The double-checking process will be described as follows. That is, if the duty cycles of two consecutive pulse width modulation signals Sp from the main circuit 9 are both lower than or equal to the first threshold value, i.e., checked twice, the detection control circuit 13 confirms that the operation mode of the motor 10 needs to be switched from the forward rotation mode to the reverse rotation mode. Whereas, if the duty cycle of one of two consecutive pulse width modulation signals Sp from the main circuit 9 is higher than the first threshold value, the detection control circuit 13 confirms that the operation mode of the motor 10 does not need to be switched from the forward rotation mode to the reverse rotation mode. Consequently, even if the erroneous operation of the main circuit 9 occurs or the transmission of the pulse width modulation signal Sp is interfered, the motor 10 will not be repeatedly switched between the forward rotation mode and the reverse rotation mode.

In an embodiment, the driving signal outputted from the detection control circuit 13 to the motor controller 120 contains a signal corresponding to the duty cycle and a mode switching signal. If the double-checking process confirms that the duty cycles of two consecutive pulse width modulation signals Sp are both lower than or equal to the first threshold value, the mode switching signal outputted from the detection control circuit 13 to the motor control module 12 has a first logic voltage level. Whereas, if the double-checking process confirms that the duty cycle of one of two consecutive pulse width modulation signals Sp is higher than the first threshold value, the mode switching signal outputted from the detection control circuit 13 to the motor control module 12 has a second logic voltage level. When the mode switching signal having the first logic voltage level or the second logic voltage level is received, the motor controller 120 correspondingly controls the switching sequence of the power switch element of the power switch circuit 121. Consequently, the direction of the current flowing through the coil of the motor 10 is adjusted, and the direction of the fan blade is correspondingly adjusted. For example, in case that the mode switching signal having the first logic voltage level is continuously received, the motor 10 is in the forward rotation mode under control of the motor controller 120. Whereas, in case that the mode switching signal having the second logic voltage level is continuously received, the motor 10 is in the reverse rotation mode under control of the motor controller 120. In an embodiment, the first logic voltage level is a high logic voltage level, and the second logic voltage level is a low logic voltage level. In another embodiment, the first logic voltage level is a low logic voltage level, and the second logic voltage level is a high logic voltage level.

Moreover, the detection control circuit 13 further comprises a time counter 130 for counting time. According to the time length counted by the time counter 130, the detection control circuit 13 maintains the voltage level of the mode switching signal at the first logic voltage level or the second logic voltage level. Consequently, the detection control circuit 13 drives the motor control module 12 to control the operating time of the motor 10 in the forward rotation mode and/or the operating time of the motor 10 in the reverse rotation mode. Moreover, when the control system 1 is started, the motor control module 12 controls the motor 10 to be operated in the forward rotation mode according to the driving signal outputted from the detection control circuit 13. Consequently, when the control system 1 is started, the motor 10 is rotated forwardly.

Besides, after the control system 1 is started, the motor 10 is operated in the forward rotation mode and rotated for a predetermined forward time period (e.g., 1 hour) under control of the detection control circuit 13 and the motor control module 12. Once the motor 10 is operated in the reverse rotation mode, the motor 10 is rotated for a predetermined reverse time period (e.g., 20, 25, 30, 35 or 40 seconds) under control of the detection control circuit 13 and the motor control module 12. The predetermined forward time period and the predetermined reverse time period are counted by the time counter 130 of the detection control circuit 13.

Moreover, while the motor 10 is operated in the reverse rotation mode, the detection control circuit 13 double-checks whether the duty cycle is higher than or equal to a second threshold value. If the duty cycle is higher than or equal to the second threshold value, the detection control circuit 13 drives the motor control module 12 to switch the operation mode of the motor 10 from the reverse rotation mode to the forward rotation mode according to the driving signal. Consequently, the fan can dissipate the heat.

In an embodiment, the control system 1 further comprises a regulating circuit 14. An example of the regulating circuit 14 includes, but is not limited to, a DC/DC converter. The regulating circuit 14 is electrically connected with the detection control circuit 13 and the motor control module 12. The regulating circuit 14 is used for receiving an input DC voltage Vcc from the electronic device and reducing the input DC voltage Vcc to an output DC voltage. The output DC voltage is used for powering the detection control circuit 13 and the motor control module 12. For example, the magnitude of the input DC voltage Vcc is 12V, and the magnitude of the output DC voltage is 5V.

The control system 1 further comprises a Hall detection circuit 15. The Hall detection circuit 15 is electrically connected with the motor 10 and the motor control module 12. The Hall detection circuit 15 comprises one Hall element or plural Hall elements for detecting the changes of the magnetic poles of rotators of the motor 10 (i.e., the fan blade magnetic poles) and positioning the magnetic poles. Moreover, the detecting result is transmitted to the motor control module 12. According to the detecting result of the Hall detection circuit 15, the motor control module 12 realizes the positions of the magnetic poles and dynamically controls the operations of the motor 10.

Moreover, the electronic device is further equipped with a protection mechanism. The protection mechanism is enabled or disabled according to the result of judging whether the fan is normally operated. In detail, if the fan is normally operated (e.g., forwardly rotated or reversely rotated), the main circuit 9 of the electronic device judges that the fan is normally operated. Under this circumstance, the protection mechanism is disabled. If the fan is abnormal and/or the rotation of the fan is stopped, the main circuit 9 of the electronic device judges that the fan is abnormal and the protection mechanism is enabled. After the protection mechanism is enabled, the electronic device is not damaged because of the overheated problem for example. For enabling or disabling the protection mechanism according to the result of judging whether the fan is normally operated, the control system 1 further comprises a frequency output circuit 16 and a frequency simulation circuit 17. The frequency output circuit 16 is electrically connected with the motor controller 120 of the motor control module 12 and the detection control circuit 13. While the motor 10 is operated in the forward rotation mode or the reverse rotation mode, an actual frequency signal corresponding to the rotation speed of the motor 10 is outputted from the frequency output circuit 16 to the detection control circuit 13 under control of the motor controller 120. While the motor 10 is in an inertia stop state (e.g., the transition interval between the forward rotation mode and the reverse rotation mode), the frequency output circuit 16 stops outputting the actual frequency signal. The frequency simulation circuit 17 is electrically connected with the main circuit 9 of the electronic device and the detection control circuit 13. While the motor 10 is operated in the forward rotation mode or the reverse rotation mode, the actual frequency signal from the frequency output circuit 16 is received by detection control circuit 13. Consequently, the frequency simulation circuit 17 is disabled under control of the detection control circuit 13, and the actual frequency signal is transmitted from the detection control circuit 13 to the main circuit 9 through the frequency simulation circuit 17. While the motor 10 is in the inertia stop state (e.g., the transition interval between the forward rotation mode and the reverse rotation mode), the frequency simulation circuit 17 is enabled under control of the detection control circuit 13. Consequently, the frequency simulation circuit 17 generates a simulated frequency signal to the main circuit 9. The simulated frequency signal is correlated with the simulation of a specified rotation speed of the motor 10. For example, the simulated frequency signal is a frequency signal corresponding to the rotation speed of 500 RPM.

While the motor controller 120 drives the motor 10 to be operated in the forward rotation mode or the reverse rotation mode, the actual frequency signal is outputted from the frequency output circuit 16 to the detection control circuit 13 under control of the motor controller 120. Meanwhile, the frequency simulation circuit 17 is disabled. Moreover, the actual frequency signal is transmitted from the detection control circuit 13 to the main circuit 9 through the frequency simulation circuit 17. Under this circumstance, the main circuit 9 judges that the fan is normally operated, and thus the protection mechanism is not enabled. While the motor 10 is in the inertia stop state, the detection control circuit 13 cannot receive the actual frequency signal outputted from the frequency output circuit 16. Meanwhile, the frequency simulation circuit 17 generates the simulated frequency signal to the main circuit 9 under control of the detection control circuit 13. Under this circumstance, the main circuit 9 judges that the fan is normally operated when the motor 10 is in the inertia stop state, and thus the protection mechanism is not enabled.

In an embodiment, after the actual frequency signal from the frequency output circuit 16 has not been outputted for a specified time period, the frequency output circuit 16 outputs the actual frequency signal again. The specified time period is larger than or equal to the time interval when the motor 10 is in the inertia stop state. For example, the specified time interval is 3.3 seconds. In another embodiment, after the actual frequency signal from the frequency output circuit 16 is not outputted and the rotation speed of the motor 10 is higher than a specified rotation speed (e.g., 0 RPM), the frequency output circuit 16 outputs the actual frequency signal again.

Figure 2:
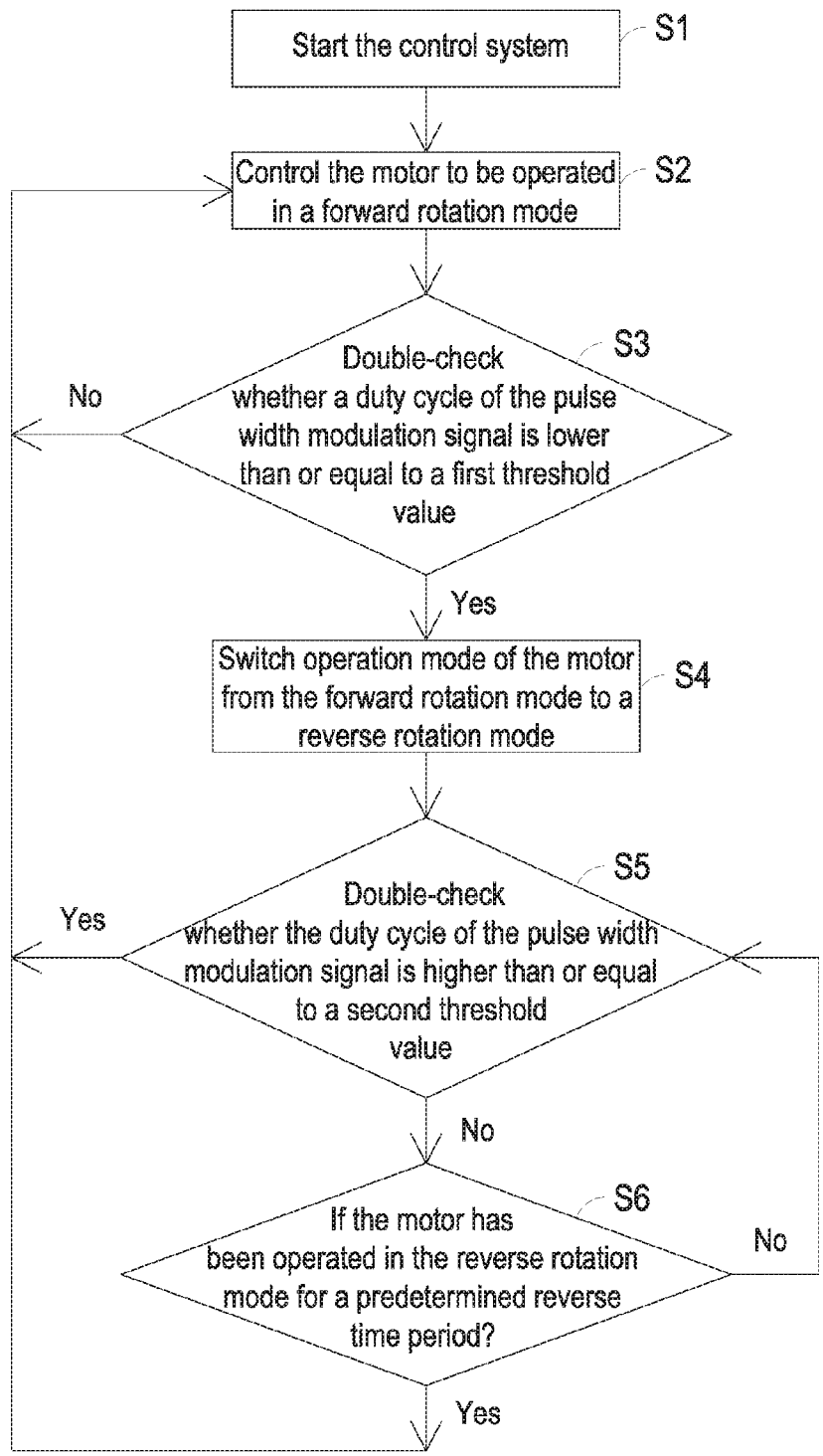
FIG. 2 is a flowchart illustrating a control method for the control system of FIG. 1.

FIG. 2 is a flowchart illustrating a control method for the control system of FIG. 1. The control method comprises the following steps.

In a step S1, the control system 1 is started. In this step, the input DC voltage Vcc is 12V, and the duty cycle of the pulse width modulation signal Sp is 100%. The above-mentioned related parameters are employed for starting the control system 1.

Then, in a step S2, the motor 10 is operated in a forward rotation mode under control of the detection control circuit 13 and the motor control module 12. In this step, regardless variation of the duty cycle of the pulse width modulation signal Sp, the motor 10 is operated in the forward rotation mode under control of the detection control circuit 13 and the motor control module 12. Within a predetermined forward time period, the detection control circuit 13 reads the converted pulse width modulation signal Sp from the interface circuit 11 in real time. Consequently, the detection control circuit 13 drives the motor control module 12 to adjust the rotation speed of the motor 10 and so as the rotation speed of the fan. According to the heat-dissipating demand of the electronic device, the rotation speed of the fan is adaptively adjusted to provide sufficient heat-dissipating capability to the electronic device.

After the step S2, a step S3 is performed to double-check whether the duty cycle of the pulse width modulation signal Sp is lower than or equal to a first threshold value. For example, the first threshold value is an arbitrary value between 40% and 49%, preferably an arbitrary value between 45% and 48%, and the most preferably 46%. In particular, in the step S3, the double-checking process is used to judge whether the duty cycles of two consecutive pulse width modulation signals Sp are both lower than or equal to the first threshold value, i.e., checked twice. If the duty cycles of two consecutive pulse width modulation signals Sp are both lower than or equal to the first threshold value, it means that the heat-dissipating demand of the electronic device is reduced. Under this circumstance, the control system 1 confirms that the operation mode of the motor 10 needs to be switched from the forward rotation mode to the reverse rotation mode. While the motor 10 is operated in the reverse rotation mode and the procedure of eliminating dust is performed for a certain time period, the influence of the reverse rotation of the motor 10 on the heat-dissipating efficacy of the electronic device will be reduced.

If the duty cycle of the pulse width modulation signal Sp is not lower than or equal to the first threshold value in the step S3, the step S2 is performed again. On the other hand, if the duty cycle of the pulse width modulation signal Sp is lower than or equal to the first threshold value in the step S3, the step S4 is performed. In the step S4, the mode switching signal having a first logic voltage level is outputted from the detection control circuit 13. According to the mode switching signal having the first logic voltage level, operation mode of the motor 10 is switched from the forward rotation mode to the reverse rotation mode under control of the motor control module 12. In the transition interval when operation mode of the motor 10 is switched from the forward rotation mode to the reverse rotation mode, the motor 10 and the fan are gradually stopped because of inertia (i.e., in the inertia stop state). After the motor 10 is completely stopped because of inertia, operation mode of the motor 10 is switched to the reverse rotation mode. Moreover, in the inertia stop state, the detection control circuit 13 drives the frequency simulation circuit 17 to issue a simulated frequency signal.

After the step S4, a step S5 is performed to double-check whether the duty cycle of the pulse width modulation signal Sp is higher than or equal to a second threshold value. If the duty cycle of the pulse width modulation signal Sp is higher than or equal to the second threshold value in the step S5, the mode switching signal having a second logic voltage level is outputted from the detection control circuit 13. According to the mode switching signal having the second logic voltage level, operation mode of the motor 10 is switched from the reverse rotation mode to the forward rotation mode under control of the motor control module 12. That is, the step S2 is performed again. Whereas, if the duty cycle of the pulse width modulation signal Sp is not higher than or equal to the second threshold value in the step S5, a step S6 is performed to judge whether the motor 10 has been operated in the reverse rotation mode for a predetermined reverse time period. If the judging result of the step S6 indicates that the motor 10 has been operated in the reverse rotation mode for the predetermined reverse time period, the mode switching signal having the second logic voltage level is outputted from the detection control circuit 13. According to the mode switching signal having the second logic voltage level, operation mode of the motor 10 is switched from the reverse rotation mode to the forward rotation mode under control of the motor control module 12. That is, the step S2 is performed again. Whereas, if the judging result of the step S6 indicates that the motor 10 has not been operated in the reverse rotation mode for the predetermined reverse time period, the step S5 is performed again.

While the motor 10 is operated in the reverse rotation mode (in the step S5), if the heat-dissipating demand of the electronic device is required and the duty cycle of the pulse width modulation signal Sp outputted from the main circuit 9 is higher than or equal to the second threshold value, operation mode of the motor 10 is switched from the reverse rotation mode to the forward rotation mode under control of the motor control module 12. Consequently, the fan can dissipate heat immediately. In the step S6, the motor 10 is operated in the reverse rotation mode for the predetermined reverse time period. During the predetermined reverse time period, the fan is reversely rotated to eliminate dust. If the motor 10 has been operated in the reverse rotation mode for the predetermined reverse time period, operation mode of the motor 10 is switched from the reverse rotation mode to the forward rotation mode under control of the motor control module 12. Consequently, the fan is forwardly rotated to dissipate heat again.

Figure 3:
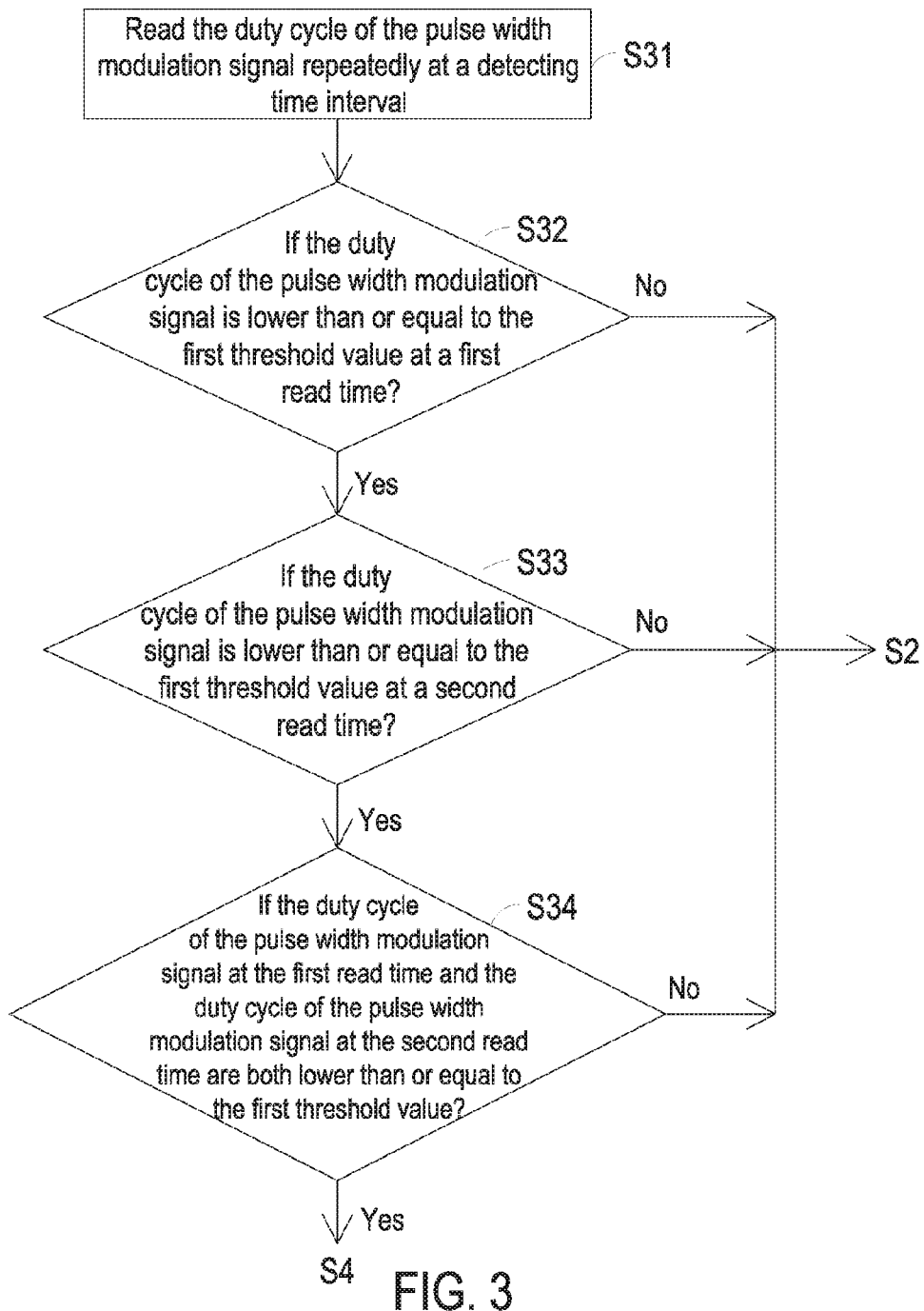
FIG. 3 is a flowchart illustrating the step S3 of the control method of FIG. 2.

FIG. 3 is a flowchart illustrating the step S3 of the control method of FIG. 2. Then, the step S3 comprises sub-steps S31, S32, S33, and S34. In the sub-step S31, the duty cycle of the pulse width modulation signal Sp is repeatedly read by the detection control circuit 13 at a detecting time interval (e.g., 2 microseconds). Then, the sub-step S32 is performed to judge whether the duty cycle of the pulse width modulation signal Sp is lower than or equal to the first threshold value at a first read time. If the judging step of the sub-step S32 is satisfied, the sub-step S33 is performed to judge whether the duty cycle of the pulse width modulation signal Sp is lower than or equal to the first threshold value at a second read time. If the judging step of the sub-step S33 is satisfied, the sub-step S34 is performed to judge whether the duty cycle of the pulse width modulation signal Sp at the first read time and the duty cycle of the pulse width modulation signal Sp at the second read time are both lower than or equal to the first threshold value. If the judging step of the sub-step S34 is satisfied, the step S4 is performed.

Moreover, if the judging step of the sub-step S32 is not satisfied, the step S2 is performed again. Moreover, if the judging step of the sub-step S33 is not satisfied, the step S2 is performed again. Moreover, if the judging step of the sub-step S34 is not satisfied, the step S2 is performed again.

Figure 4:
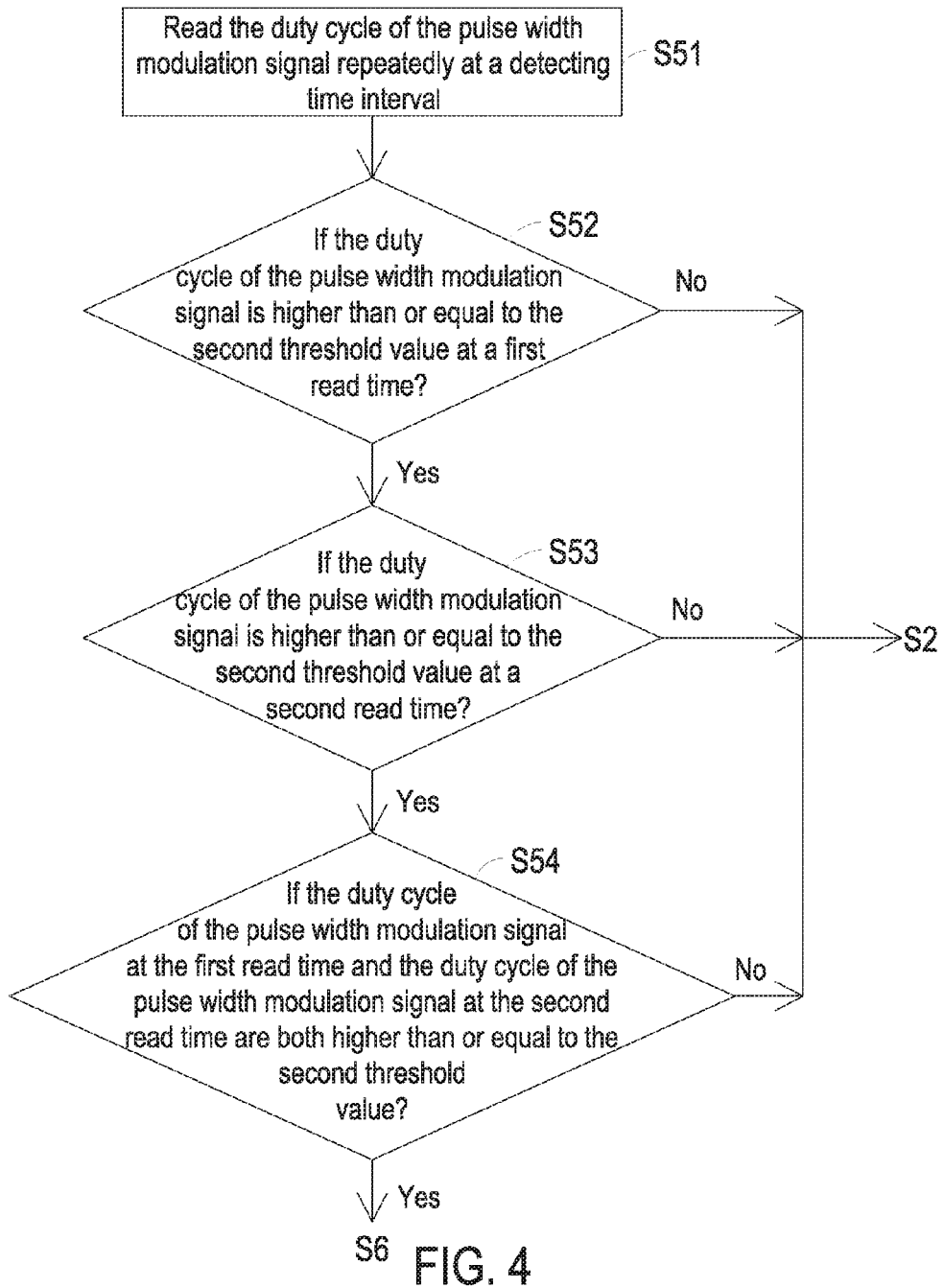
FIG. 4 is a flowchart illustrating the step S5 of the control method of FIG. 2.

FIG. 4 is a flowchart illustrating the step S5 of the control method of FIG. 2. Then, the step S5 comprises sub-steps S51, S52, S53, and S53. In the sub-step S51, the duty cycle of the pulse width modulation signal Sp is repeatedly read by the detection control circuit 13 at a detecting time interval (e.g., 2 microseconds). Then, the sub-step S52 is performed to judge whether the duty cycle of the pulse width modulation signal Sp is higher than or equal to the second threshold value at a first read time. If the judging step of the sub-step S52 is satisfied, the sub-step S53 is performed to judge whether the duty cycle of the pulse width modulation signal Sp is higher than or equal to the second threshold value at a second read time. If the judging step of the sub-step S53 is satisfied, the sub-step S54 is performed to judge whether the duty cycle of the pulse width modulation signal Sp at the first read time and the duty cycle of the pulse width modulation signal Sp at the second read time are both higher than or equal to the second threshold value. If the judging step of the sub-step S54 is satisfied, the step S6 is performed.

Moreover, if the judging step of the sub-step S52 is not satisfied, the step S2 is performed again. Moreover, if the judging step of the sub-step S53 is not satisfied, the step S2 is performed again. Moreover, if the judging step of the sub-step S54 is not satisfied, the step S2 is performed again.

Figure 5:
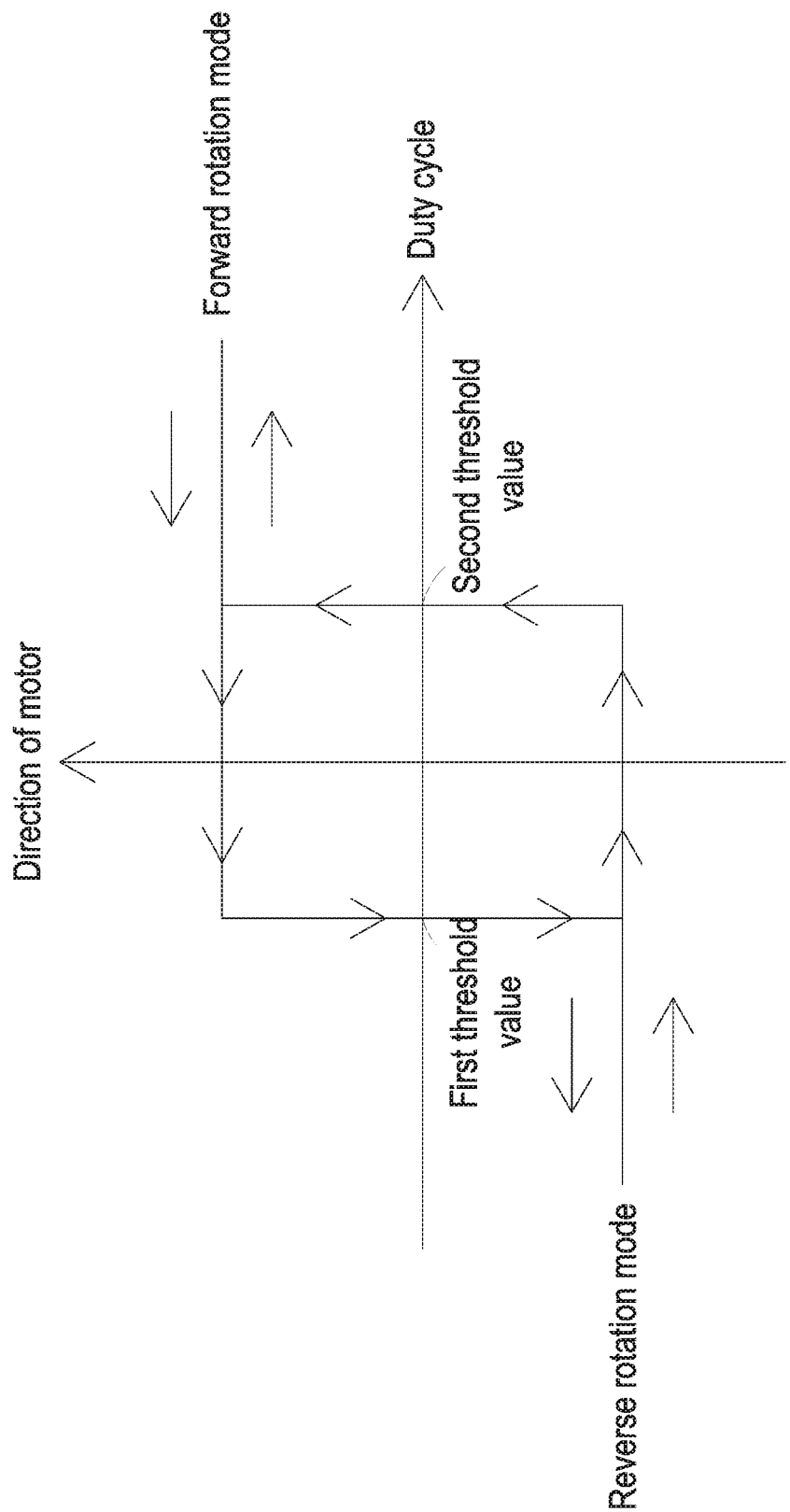
FIG. 5 is a hysteresis loop illustrating the relationship between the duty cycle of the pulse width modulation signal and the rotation direction of the motor according to the control system of FIG. 1 and the control method of FIG. 2 of the present invention.

FIG. 5 is a hysteresis loop illustrating the relationship between the duty cycle of the pulse width modulation signal and the rotation direction of the motor according to the control system of FIG. 1 and the control method of FIG. 2 of the present invention. During the transition interval between the forward rotation mode and the reverse rotation mode, if the heat-dissipating demand of the electronic device is required, the main circuit 9 adjusts the duty cycle of the pulse width modulation signal Sp. Consequently, the duty cycle of the pulse width modulation signal Sp fluctuates. Moreover, in case that the heat-dissipating demand is erroneously judged because of an external force or some other factors, the pulse width modulation signal Sp from the main circuit 9 cannot reflect the actual heat-dissipating demand. If the erroneous judgment occurs, the operation mode of the motor 10 may be erroneously switched from the forward rotation mode to the reverse rotation mode or erroneously switched from the reverse rotation mode to the forward rotation mode. In accordance with the control method of the present invention, the double-checking process is used to confirm the duty cycle, and the hysteresis loop of FIG. 5 is used to judge whether the duty cycle of the pulse width modulation signal Sp is lower than or equal to the first threshold value or whether the duty cycle of the pulse width modulation signal Sp is higher than or equal to the second threshold value. Consequently, by using of the control system 1 and the control method of the present invention, the possibility of erroneously judging the heat-dissipating demand by the main circuit 9 will be minimized.

Figure 6:
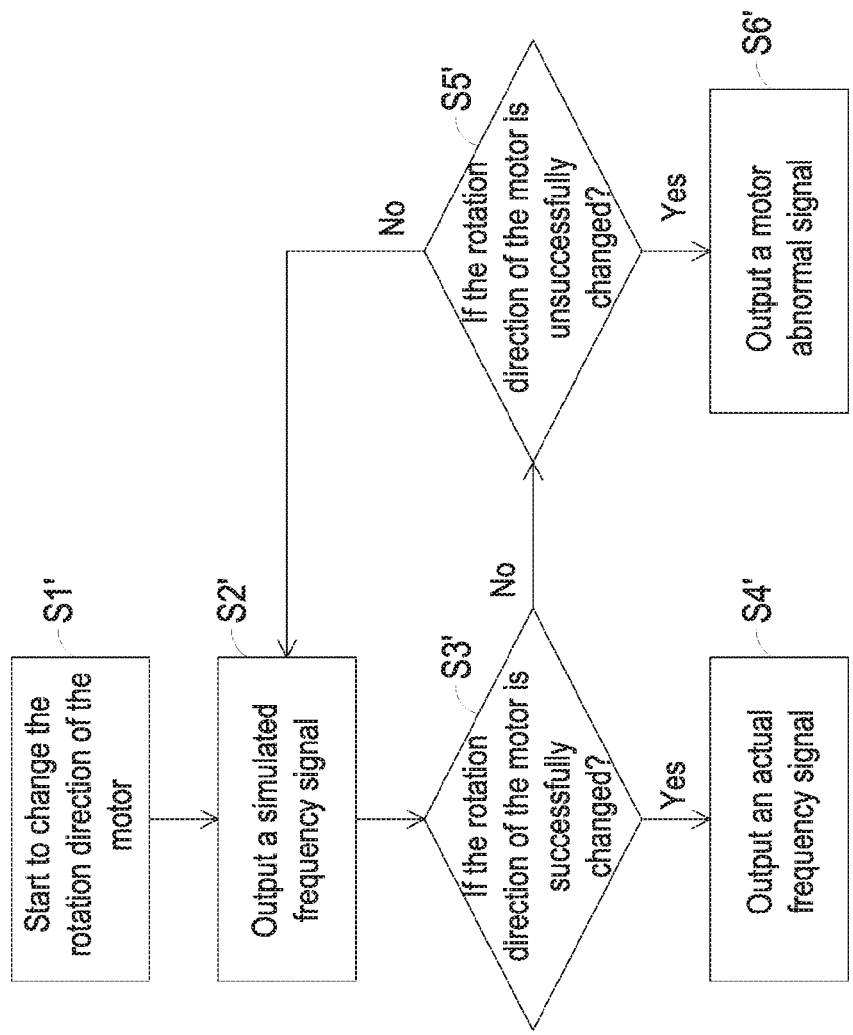
FIG. 6 is a flowchart illustrating the process of outputting a simulated frequency signal from the frequency simulation circuit issues and the process of outputting the actual frequency signal from the frequency output circuit according to the present invention.

FIG. 6 is a flowchart illustrating the process of outputting a simulated frequency signal from the frequency simulation circuit issues and the process of outputting the actual frequency signal from the frequency output circuit according to the present invention. Firstly, in a step S1', the rotation direction of the motor 10 is changed when the duty cycle of the pulse width modulation signal Sp complies with a direction-changing condition. That is, if the motor 10 is operated in the forward rotation mode and the control system 1 double-checks that the duty cycle of the pulse width modulation signal Sp is lower than or equal to the first threshold value, or if the motor 10 is operated in the reverse rotation mode and the control system 1 double-checks that the duty cycle of the pulse width modulation signal Sp is higher than or equal to the second threshold value, the direction-changing condition is satisfied. Consequently, the detection control circuit 13 issues a corresponding signal to switch the rotation direction of the motor 10 from the forward rotation mode to the reverse rotation mode or from the reverse rotation mode to the forward rotation mode. That is, the rotation direction of the motor 10 is changed.

While the rotation direction of the motor 10 is switched, the fan is gradually stopped because of inertia (i.e., in the inertia stop state). After the motor 10 is completely stopped because of inertia, the rotation direction of the motor 10 is switched. As mentioned above, if the main circuit 9 erroneously judges that the fan is abnormal, the protection mechanism will be enabled erroneously. For preventing from erroneously enabling the protection mechanism, a step S2' is performed. That is, while the motor 10 is in the inertia stop state, the detection control circuit 13 drives the frequency simulation circuit 17 to generate a simulated frequency signal. Then, a step S3' is performed to judge whether the rotation direction of the motor 10 is successfully changed. For example, if the simulated frequency signal generated from the frequency simulation circuit 17 has been outputted for a specified time period, or if the rotation speed of the motor 10 is higher than a specified rotation speed, the control system 1 can judge whether the rotation direction of the motor 10 is successfully changed. If the judging step of the step S3' is satisfied, a step S4' is performed. In the step S4', the frequency output circuit 16 outputs the actual frequency signal. The actual frequency signal is transmitted from the detection control circuit 13 to the main circuit 9 through the frequency simulation circuit 17. Whereas, if the judging step of the step S3' is not satisfied, a step S5' is performed to judge whether the rotation direction of the motor 10 is unsuccessfully changed because of an abnormal condition. If the judging step of the step S5' is satisfied, a step S6' is performed. In the step S6', the control system 1 issues a motor abnormal signal to the main circuit 9 and thus a subsequent warning process is performed. Whereas, if the judging step of the step S5' is not satisfied, that means the motor 10 is normal and then the step S2' is performed again to continuously change the rotation direction of the motor 10.

The present invention provides a control system and a control method for controlling a forward/reverse rotation of a fan of an electronic device. In accordance with the present invention, the motor is operated in the forward rotation mode or the reverse rotation mode according to a result of double-checking the duty cycle of the pulse width modulation signal. The control system can dynamically control the forwardly rotation of the motor and so as the fan to dissipate heat of the electronic device and dynamically control the reversely rotation of the motor and so as the fan to remove dust from the fan blade. Moreover, the control system of the present invention controls the rotation direction of the motor according to the duty cycle of the pulse width modulation signal. Under this circumstance, a greater portion of the control circuitry does not need to be modified. In other words, by simply setting some parameters such as the first threshold value and the second threshold value, the functions of controlling the forward rotation, the reverse rotation, the braking action, the stopping action and the minimum rotation speed of the motor can be achieved. Moreover, the control system of the present invention can control the rotation direction of the motor according to the automatic detecting mechanism and the internal counting mechanism. Consequently, the heat-dissipating demand of the electronic device can be monitored in real time, and the mechanism of automatically eliminating dust can be enabled to enhance the dust-eliminating efficacy. Moreover, the control system is simplified and need not be additionally equipped with complicated circuitry. For example, the relatively simpler circuitry configurations of the frequency output circuit and the frequency simulation circuit. While the motor is in an inertia stop state (e.g., the transition interval between the forward rotation mode and the reverse rotation mode), the frequency simulation circuit issues the simulated frequency signal to the main circuit of the electronic device. Consequently, while the motor is in the inertia stop state, the main circuit judges that the fan is normally operated and the protection mechanism is not enabled.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A control system for controlling forward/reverse rotation of a fan of an electronic device, the control system comprising:
    a motor for driving rotation of the fan;
    an interface circuit for receiving and converting a pulse width modulation signal;
    a motor controller electrically connected with the motor for controlling a rotation speed of the motor and controlling the motor to be operated in a forward rotation mode or a reverse rotation mode, wherein the fan is forwardly rotated to dissipate heat when the motor is operated in the forward rotation mode, and wherein the fan is reversely rotated to eliminate dust when the motor is operated in the reverse rotation mode; and
    a detection control circuit electrically connected with the interface circuit and the motor controller for reading a duty cycle of the converted pulse width modulation signal in real time, wherein when the motor is operated in the forward rotation mode, the detection control circuit drives the motor controller to control the rotation speed of the fan according to the duty cycle, and the detection control circuit double-checks whether the duty cycle is lower than or equal to a first threshold value, wherein if the duty cycle is lower than or equal to the first threshold value, the detection control circuit drives the motor controller to switch operation mode of the motor from the forward rotation mode to the reverse rotation mode.

2. The control system according to claim 1, wherein the motor controller controls the motor to be operated in the forward rotation mode when the control system is started.

3. The control system according to claim 1, wherein when the motor is in the reverse rotation mode, the detection control circuit further double-checks whether the duty cycle is higher than or equal to a second threshold value, wherein if the duty cycle is higher than or equal to the second threshold value, the detection control circuit drives the motor controller to switch operation mode of the motor from the reverse rotation mode to the forward rotation mode.

4. The control system according to claim 1, wherein the rotation speed of the motor in the reverse rotation mode is fixed at 3000 RPM.

5. The control system according to claim 1, wherein the detection control circuit further comprises a time counter for counting time.

6. The control system according to claim 5, wherein when the motor is operated in the reverse rotation mode, the detection control circuit drives the motor controller to rotate the motor for a predetermined reverse time period according to a time length counted by the time counter.

7. The control system according to claim 5, wherein when the motor is operated in the forward rotation mode, the detection control circuit drives the motor controller to rotate the motor for a predetermined forward time period according to a time length counted by the time counter.

8. The control system according to claim 1, further comprising:
    a frequency simulation circuit electrically connected with the detection control circuit, wherein while the motor is operated in the forward rotation mode or the reverse rotation mode, the frequency simulation circuit is disabled, wherein while the motor is in an inertia stop state, the frequency simulation circuit issues a simulated frequency signal to the electronic device; and
    a frequency output circuit electrically connected with the motor controller and the detection control circuit, wherein while the motor is operated in the forward rotation mode or the reverse rotation mode, an actual frequency signal corresponding to the rotation speed of the motor is outputted from the frequency output circuit to the electronic device through the detection control circuit and the frequency simulation circuit, wherein while the motor is in the inertia stop state, the frequency output circuit stops outputting the actual frequency signal.

9. The control system according to claim 8, wherein after the actual frequency signal has not been outputted from the frequency output circuit, and after the actual frequency signal is not outputted from the frequency output circuit for a specified time period or the rotation speed of the motor is higher than a specified rotation speed, the frequency output circuit outputs the actual frequency signal again, wherein the specified time period is larger than or equal to a time interval when the motor is in the inertia stop state.

10. The control system according to claim 8, wherein the simulated frequency signal is a frequency signal corresponding to a specified rotation speed of the motor, wherein the specified rotation speed of the motor is 500 RPM.

11. A control method for a control system, the control system controlling a fan of an electronic device according to a pulse width modulation signal outputted from the electronic device, the control system comprising a motor for rotating the fan, the control method comprising steps of:
(a) starting the control system;
(b) controlling the motor to be operated in a forward rotation mode;
(c) double-checking whether a duty cycle of the pulse width modulation signal is lower than or equal to a first threshold value;
(d) if the duty cycle of the pulse width modulation signal is lower than or equal to the first threshold value in the step (c), switching operation mode of the motor from the forward rotation mode to a reverse rotation mode;
(e) double-checking whether the duty cycle of the pulse width modulation signal is higher than or equal to a second threshold value;
(f) if the duty cycle of the pulse width modulation signal is not higher than or equal to the second threshold value in the step (e), judging whether the motor has been operated in the reverse rotation mode for a predetermined reverse time period; and
(g) if the motor has been operated in the reverse rotation mode for a predetermined reverse time period in the step (f), performing the step (b) again.

12. The control method according to claim 11, wherein while operation mode of the motor is switched from the forward rotation mode to the reverse rotation mode in the step (d), a simulated frequency signal that simulates a specified rotation speed of the motor is transmitted from the control system to the electronic device.

13. The control method according to claim 11, wherein if the duty cycle of the pulse width modulation signal is not lower than or equal to the first threshold value in the step (c), the step (b) is performed again.

14. The control method according to claim 13, wherein the step (c) comprises sub-steps of:
(c1) repeatedly reading the duty cycle of the pulse width modulation signal at a detecting time interval;
(c2) judging whether the duty cycle of the pulse width modulation signal is lower than or equal to the first threshold value at a first read time;
(c3) if the duty cycle of the pulse width modulation signal is lower than or equal to the first threshold value in the sub-step (c2), judging whether the duty cycle of the pulse width modulation signal is lower than or equal to the first threshold value at a second read time; and
(c4) if the duty cycle of the pulse width modulation signal is lower than or equal to the first threshold value in the sub-step (c3), judging whether the duty cycle of the pulse width modulation signal at the first read time and the duty cycle of the pulse width modulation signal at the second read time are both lower than or equal to the first threshold value,
wherein if a judging result of the sub-step (c4) is satisfied, the step (d) is performed.

15. The control method according to claim 14, wherein if a judging result of the sub-step (c2), (c3) or (c4) is not satisfied, the step (b) is performed again.

16. The control method according to claim 11, wherein if the duty cycle of the pulse width modulation signal is higher than or equal to the second threshold value in the step (e), the step (b) is performed again.

17. The control method according to claim 16, wherein the step (e) comprises sub-steps of:

(e1) repeatedly reading the duty cycle of the pulse width modulation signal at a detecting time interval;
(e2) judging whether the duty cycle of the pulse width modulation signal is higher than or equal to the second threshold value at a first read time;
(e3) if the duty cycle of the pulse width modulation signal is higher than or equal to the second threshold value in the sub-step (e2), judging whether the duty cycle of the pulse width modulation signal is higher than or equal to the second threshold value at a second read time; and
(e4) if the duty cycle of the pulse width modulation signal is higher than or equal to the second threshold value in the sub-step (e3), judging whether the duty cycle of the pulse width modulation signal at the first read time and the duty cycle of the pulse width modulation signal at the second read time are both higher than or equal to the second threshold value,
wherein if a judging result of the sub-step (e4) is satisfied, the step (b) is performed again.

18. The control method according to claim 17, wherein if a judging result of the sub-step (e2), (e3) or (e4) is not satisfied, the step (b) is performed again.

19. The control method according to claim 11, wherein if the motor has not been operated in the reverse rotation mode for the predetermined reverse time period in the step (f), the step (e) is performed again.

20. A control system for controlling forward/reverse rotation of a fan of an electronic device, the control system comprising:
a motor for driving rotation of the fan;
an interface circuit for receiving and converting a pulse width modulation signal;
a motor controller electrically connected with the motor for controlling a rotation speed of the motor and controlling the motor to be operated in a forward rotation mode or a reverse rotation mode, wherein the fan is forwardly rotated to dissipate heat when the motor is operated in the forward rotation mode, and the fan is reversely rotated to eliminate dust when the motor is operated in the reverse rotation mode;
a detection control circuit electrically connected with the interface circuit and the motor controller for reading a duty cycle of the converted pulse width modulation signal in real time, wherein when the motor is operated in the forward rotation mode, the detection control circuit drives the motor controller to control the rotation speed of the fan according to the duty cycle, and the detection control circuit double-checks whether the duty cycle is lower than or equal to a first threshold value, wherein if the duty cycle is lower than or equal to the first threshold value, the detection control circuit drives the motor controller to switch operation mode of the motor from the forward rotation mode to the reverse rotation mode;
a frequency simulation circuit electrically connected with the detection control circuit, wherein while the motor is in an inertia stop state, the frequency simulation circuit issues a simulated frequency signal to the electronic device; and
a frequency output circuit electrically connected with the motor controller and the detection control circuit, wherein while the motor is operated in the forward rotation mode or the reverse rotation mode, an actual frequency signal corresponding to the rotation speed of the motor is outputted from the frequency output circuit to the electronic device through the detection control circuit and the frequency simulation circuit.

* * * * *